United States Patent
Kwon et al.

(10) Patent No.: US 12,526,128 B2
(45) Date of Patent: Jan. 13, 2026

(54) APPARATUS AND METHOD FOR CIPHERTEXT COMPARISON CAPABLE OF PREVENTING SIDE CHANNEL ATTACK

(71) Applicants: SAMSUNG SDS CO., LTD., Seoul (KR); KOOKMIN UNIVERSITY INDUSTRY ACADEMY COOPERATION FOUNDATION, Seoul (KR)

(72) Inventors: Jihoon Kwon, Seoul (KR); Joohee Lee, Seoul (KR); Jihoon Cho, Seoul (KR); Jaeseung Han, Hwaseong-si (KR); Taeho Lee, Seoul (KR); Dong-Guk Han, Seoul (KR)

(73) Assignees: SAMSUNG SDS CO., LTD., Seoul (KR); KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 50 days.

(21) Appl. No.: 18/702,071

(22) PCT Filed: Oct. 28, 2022

(86) PCT No.: PCT/KR2022/016659
§ 371 (c)(1),
(2) Date: Apr. 17, 2024

(87) PCT Pub. No.: WO2023/075490
PCT Pub. Date: May 4, 2023

(65) Prior Publication Data
US 2024/0413970 A1    Dec. 12, 2024

(30) Foreign Application Priority Data
Oct. 28, 2021    (KR) .......... 10-2021-0145850

(51) Int. Cl.
H04L 29/06    (2006.01)
H04L 9/06    (2006.01)

(52) U.S. Cl.
CPC ............... H04L 9/0618 (2013.01)

(58) Field of Classification Search
CPC ............................................ H04L 9/0618
See application file for complete search history.

(56) References Cited

U.S. PATENT DOCUMENTS 7,865,917 B2 *   1/2011   Hellman .......... H04N 21/4405
                                                     725/31
9,425,959 B1 *   8/2016   Pedersen ............. H04L 9/3242
(Continued)

FOREIGN PATENT DOCUMENTS

KR    10-2020-0089832 A    7/2020

OTHER PUBLICATIONS

Alkim, Erdem, et al. "FrodoKEM: Learning With Errors key encapsulation: algorithm specifications and supporting documentation (2021)." URL: https://web.archive.org/web/20220119174856/https://frodokem.org/files/FrodoKEM-specification-20210604.pdf. Citations in this document 1.2: 6. (Sep. 30, 2020) pp. 1-59.

(Continued)

*Primary Examiner* — Evans Desrosiers
(74) *Attorney, Agent, or Firm* — NSIP Law

(57) ABSTRACT

A ciphertext comparison method according to an embodiment is performed by a processor in a computing apparatus, and the method includes an operation of segmenting a first ciphertext and a second ciphertext into m part bitstreams (in this instance, m is a natural number satisfying $1<m$), respectively; an operation of extracting a value corresponding to a $j-1^{th}$ part bitstream (in this instance, $j=i+1$, i is a natural number satisfying $0 \leq i \leq m-1$) of the first ciphertext and a $j-1^{th}$ part bitstream of the second ciphertext, as a $j^{th}$ inter- (Continued)

mediate value between a first value and a second value in a first lookup table including the first value and the second value of which Hamming weights are identical; an operation extracting a value corresponding to the $j^{th}$ intermediate value and a $j-1^{th}$ result value, as a $j^{th}$ result value between a third value and a fourth value in a second lookup table including the third value and the fourth value of which Hamming weights are identical; and in a case of $j \neq m$, an operation of repeatedly performing extraction as the $j^{th}$ intermediate value and extraction as the $j^{th}$ result value by increasing J; and in a case of $j=m$, an operation of outputting an $m^{th}$ result value as a result value of comparison between the first ciphertext and the second ciphertext.

13 Claims, 5 Drawing Sheets

(56) References Cited

U.S. PATENT DOCUMENTS

| | | | |
|---|---|---|---|
| 2020/0136798 A1 | 4/2020 | Kim et al. | |
| 2020/0389303 A1 | 12/2020 | Kim et al. | |
| 2022/0417043 A1* | 12/2022 | Cambou | H04L 9/0822 |

OTHER PUBLICATIONS

Avanzi, Roberto, et al. "CRYSTALS—Kyber algorithm specifications and supporting documentation." NIST PQC Round 2.4 (Oct. 1, 2020): pp. 1-42.

Basso, Andrea, et al. "SABER: Mod-LWR based KEM (round 3 submission)." Online publication (2020). pp. 1-44.

Wang, Bo, et al. "Exploration of benes network in cryptographic processors: A random infection countermeasure for block ciphers against fault attacks." IEEE Transactions on Information Forensics and Security vol. 12.Issue 2 (Feb. 2017): pp. 309-322.

Extended European Search Report issued on Feb. 6, 2025, in counterpart European Patent Application No. 22887685.0 (4pages in English).

Guo, Qian, Thomas Johansson, and Alexander Nilsson. "A key-recovery timing attack on post-quantum primitives using the Fujisaki-Okamoto transformation and its application on FrodoKEM." Annual International Cryptology Conference. Cham: Springer International Publishing, LNCS 12171, 2020. (pp. 359-386).

Lee, Seungkwang, and Myungchul Kim. "Table Redundancy Method for Protecting against Differential Fault Analysis in the White-box Cryptography." IACR Cryptol. ePrint Arch, downloaded by EPO on Aug. 24, 2019. (pp. 1-18).

Xiao, Lu, and Howard M. Heys. "Software performance characterisation of block cipher structures using s-boxes and linear mappings." IEE Proceedings-Communications 152.5, Oct. 2005. (pp. 567-579).

* cited by examiner

FIG. 2

```
KEM.CCA.Encaps(pk)
1. Pick a random m
2. (r, k) ← H₁(m, pk)
3. C ← PKE.CPA.Enc(pk, m; r)
4. s ← H₂(C, k)
5. Return (C, s)

KEM.CCA.Decaps(sk, pk, C)
1. m' ← PKE.CPA.Dec(sk, C)
2. (r', k') ← H₁(m', pk)
3. C' ← PKE.CPA.Enc(pk, m'; r')
4. if(C' = C) then return s' ← H₂(C, k')
5. else return s' ← H₂(C', k')
6. end if
```

FIG. 3

| In | $C = C_{m-1} \| \cdots \| C_0$, $C' = C'_{m-1} \| \cdots \| C'_0$, $C_i, C'_i \in [0, 2^n - 1]$ |
|---|---|
| Out | Comparison result r (=0 or 0xffff in 16-bit machine) |
| 1: | $r \leftarrow 0$ |
| 2: | for i = 0 to m − 1 do |
| 3: | $r \leftarrow r \mid (C_i \oplus C'_i)$ |
| 4: | end for |
| 5: | $r \leftarrow (-r) \gg n$ |
| 6: | Return r |

FIG. 5

| | |
|---|---|
| In | $C = C_{m-1} \| \cdots \| C_0$, $C' = C'_{m-1} \| \cdots \| C'_0$, $C_i, C'_i \in [0, 2^n - 1]$ |
| Out | Comparison result $r_m$ ($=A_3$ or $A_4$) |

1:   $r_0 \leftarrow A_3$
2:   for j = 1 to m do
3:     $tmp_j \leftarrow T_1[C_{j-1} \| C'_{j-1}]$
4:     $r_j \leftarrow T_2[r_{j-1} \| tmp_j]$
5:   end for
6:   Return $r_m$

APPARATUS AND METHOD FOR CIPHERTEXT COMPARISON CAPABLE OF PREVENTING SIDE CHANNEL ATTACK

CROSS REFERENCE TO RELATED APPLICATIONS

This application is a U.S. National Stage Application of International Application No. PCT/KR2022/016659, filed on Oct. 28, 2022, which claims the benefit under 35 USC 119(a) and 365(b) of Korean Patent Application No. 10-2021-0145850, filed on Oct. 28, 2021, in the Korean Intellectual Property Office, the entire disclosure of which is incorporated herein by reference for all purposes.

TECHNICAL FIELD

Embodiments disclosed relate to cryptographic technique.

BACKGROUND ART

The National Institute of Standards and Technology (NIST) has been conducting a public contest project associated with the standardization of post quantum cryptography (PQC) since 2016, and announced 7 final candidates and 8 alternative candidates as 3 Round algorithm in 2020. In addition, from 2 Round, safety from side channel analysis was included in an algorithm selection criterion, and thus algorithm design teams updated an embodiment to be safe from simple power analysis (SPA) and submitted the same to NIST. Although it is safe from SPA, however, the results of attacks using various side channel analysis schemes such as a differential power analysis (DPA), a profiling attack, and the like are provided. Recently, a side channel attack scheme that restores a secret key using the fact that the intermediate comparison result of a ciphertext is exposed during a decapsulation process of a PQC key capsulation scheme that uses a comparison operation algorithm has been published, and accordingly, there is a desire for a safe ciphertext comparison operation algorithm.

DISCLOSURE OF INVENTION

Technical Problem

Embodiments disclosed are to provide a ciphertext comparison apparatus and method for preventing a side channel attack.

Solution to Problem

A ciphertext comparison method according to an embodiment, performed by a processor in an apparatus, the method including an operation of segmenting a first ciphertext and a second ciphertext into m part bitstreams (in this instance, m is a natural number satisfying 1<m), respectively; an operation of extracting a value corresponding to a $j-1^{th}$ part bitstream (in this instance, j=i+1, i is a natural number satisfying 0≤i≤m−1) of the first ciphertext and a $j-1^{th}$ part bitstream of the second ciphertext, as a $j^{th}$ intermediate value between a first value and a second value in a first lookup table including the first value and the second value of which Hamming weights are identical; an operation of extracting a value corresponding to the $j^{th}$ intermediate value and a $j-1^{th}$ result value, as a $j^{th}$ result value between a third value and a fourth value in a second lookup table including the third value and the fourth value of which Hamming weights are identical; and in the case of j≠m, an operation of repeatedly performing extraction as the $j^{th}$ intermediate value and extraction as the $j^{th}$ result value by increasing J; and in the case of j=m, an operation of outputting an $m^{th}$ result value as a result value of comparison between the first ciphertext and the second ciphertext.

The operation of segmenting may segment, based on a predetermined segmentation unit, the first ciphertext and the second ciphertext into m part bitstreams, respectively.

The operation of extracting as the $j^{th}$ intermediate value may extract a value of which the index is identical to a bitstream obtained by concatenating the $j-1^{th}$ part bitstream of the first ciphertext and the $j-1^{th}$ part bitstream of the second ciphertext, as the $j^{th}$ intermediate value between the first value and the second value in the first lookup table, and the operation of extracting as the $j^{th}$ result value may extract a value of which the index is identical to a value obtained by concatenating the $j^{th}$ intermediate value and the $j-1^{th}$ result value, as the $j^{th}$ result value between the third value and the fourth value in the second lookup table.

The first value and the second value may be predetermined values indicating whether the $j-1^{th}$ part bitstream of the first ciphertext and the $j-1^{th}$ part bitstream of the second ciphertext are identical, and the third value and the fourth value may be predetermined values indicating whether the first ciphertext and the second ciphertext are identical.

The $j^{th}$ intermediate value may satisfy Equation 2 below, $$tmp_j = T_1[C_{j-1} \| C'_{j-1}] = \begin{cases} A_1, & \text{if } C_{j-1} = C'_{j-1} \\ A_2, & \text{if } C_{j-1} \neq C'_{j-1} \end{cases} \quad \text{[Equation 2]}$$

(in this instance, $C_{j-1}$ denotes the $j-1^{th}$ part bitstream of the first ciphertext that satisfies $C_{j-1} \in [0,2^n)$, $C'_{j-1}$ denotes the $j-1^{th}$ part bitstream of the second ciphertext that satisfies $C'_{j-1} \in [0,2^n)$, n denotes a predetermined segmentation unit, $A_1$ denotes the first value, $A_2$ denotes the second value, and $T_1[C_{j-1}\|C'_{j-1}]$ denotes a value of which the index is $C_{j-1}\|C'_{j-1}$ in the first lookup table)

The $j^{th}$ result value may satisfy Equation 3 or Equation 4 below, $$r_j = T_1[r_{j-1} \| tmp_j] = \begin{cases} A_3 = A_1, & \text{if } r_{j-1} = tmp_j = A_1 \\ A_4 = A_2, & \text{if } r_{j-1} = A_2 \text{ or } tmp_j = A_2 \end{cases} \quad \text{[Equation 3]}$$

$$r_j = T_2[r_{j-1} \| tmp_j] = \begin{cases} A_3, & \text{if } r_{j-1} = A_3 \text{ and } tmp_j = A_1 \\ A_4, & \text{if } r_{j-1} = A_4 \text{ or } tmp_j = A_2 \end{cases} \quad \text{[Equation 4]}$$

(in this instance, $r_j$ denotes the $j^{th}$ result value, $r_0=A_3$, $tmp_j$ denotes the $j^{th}$ intermediate value, $A_3$ denotes the third value, $A_4$ denotes the fourth value, and $T_2[r_{j-1}\|tmp_j]$ denotes a value of which the index is $r_{j-1}\|tmp_j$ in the second lookup table)

A ciphertext comparison apparatus according to an embodiment may include a memory storing one or more instructions; and one or more processors executing the one or more instructions, and the one or more processors may segment a first ciphertext and a second ciphertext into m part bitstreams (in this instance, m is a natural number satisfying 1<m), respectively, may extract a value corresponding to a $j-1^{th}$ part bitstream (in this instance, j=i+1, i is a natural number satisfying 0≤i≤m−1) of the first ciphertext and a $j-1^{th}$ part bitstream of the second ciphertext, as a $j^{th}$ intermediate value between a first value and a second value in a first lookup table including the first value and the second value of which Hamming weights are identical, may extract a value corresponding to the $j^{th}$ intermediate value and a $j-1^{th}$ result value, as a $j^{th}$ result value between a third value and a fourth value in a second lookup table including the third value and the fourth value of which Hamming weights are identical, may repeatedly perform extraction as the $j^{th}$ intermediate value and extraction as the $j^{th}$ result value by increasing J, in the case of j≠m, and may output an $m^{th}$ result value as a result value of comparison between the first ciphertext and the second ciphertext in the case of j=m.

Based on a predetermined segmentation unit, the one or more processors are configured to segment the first ciphertext and the second ciphertext into m part bitstreams, respectively.

The one or more processors are configured to extract a value of which the index is identical to a bitstream obtained by concatenating the $j-1^{th}$ part bitstream of the first ciphertext and the $j-1^{th}$ part bitstream of the second ciphertext, as the $j^{th}$ intermediate value between the first value and the second value in the first lookup table, and to extract a value of which the index is identical to a value obtained by concatenating the $j^{th}$ intermediate value and the $j-1^{th}$ result value, as the $j^{th}$ result value between the third value and the fourth value in the second lookup table.

The first value and the second value are predetermined values indicating whether the $j-1^{th}$ part bitstream of the first ciphertext and the $j-1^{th}$ part bitstream of the second ciphertext are identical, and the third value and the fourth value are predetermined values indicating whether the first ciphertext and the second ciphertext are identical.

The $j^{th}$ intermediate value satisfies Equation 2 below, $$tmp_j = T_1[C_{j-1} \| C'_{j-1}] = \begin{cases} A_1, & \text{if } C_{j-1} = C'_{j-1} \\ A_2, & \text{if } C_{j-1} \neq C'_{j-1} \end{cases} \quad [\text{Equation 2}]$$

(in this instance, $C_{j-1}$ denotes the $j-1^{th}$ part bitstream of the first ciphertext that satisfies $C_{j-1} \in [0, 2^n)$, $C'_{j-1}$ denotes the $j-1^{th}$ part bitstream of the second ciphertext that satisfies $C'_{j-1} \in [0, 2^n)$, n denotes a predetermined segmentation unit, $A_1$ denotes the first value, $A_2$ denotes the second value, and $T_1[C_{j-1} \| C'_{j-1}]$ denotes a value of which the index is $C_{j-1} \| C'_{j-1}$ in the first lookup table)

The $j^{th}$ result value satisfies Equation 3 or Equation 4 below, $$r_j = T_1[r_{j-1} \| tmp_j] = \begin{cases} A_3 = A_1, & \text{if } r_{j-1} = tmp_j = A_1 \\ A_4 = A_2, & \text{if } r_{j-1} = A_2 \text{ or } tmp_j = A_2 \end{cases} \quad [\text{Equation 3}]$$

$$r_j = T_2[r_{j-1} \| tmp_j] = \begin{cases} A_3, & \text{if } r_{j-1} = A_3 \text{ and } tmp_j = A_1 \\ A_4, & \text{if } r_{j-1} = A_4 \text{ or } tmp_j = A_2 \end{cases} \quad [\text{Equation 4}]$$

(in this instance, $r_j$ denotes the $j^{th}$ result value, $r_0 = A_3$, $tmp_j$ denotes the $j^{th}$ intermediate value, $A_3$ denotes the third value, $A_4$ denotes the fourth value, and $T_2[r_{j-1} \| tmp_j]$ denotes a value of which the index is $r_{j-1} \| tmp_j$ in the second lookup table)

A computer-readable storage medium is a computer-readable storage medium that stores instructions which, when executed by a processor, cause a computing apparatus including the processor to perform operations for text-based document classification, the operations including: segmenting a first ciphertext and a second ciphertext into m part bitstreams (in this instance, m is a natural number satisfying 1<m), respectively; extracting a value corresponding to a $j-1^{th}$ part bitstream (in this instance, j=i+1, i is a natural number satisfying 0≤i≤m−1) of the first ciphertext and a $j-1^{th}$ part bitstream of the second ciphertext, as a $j^{th}$ intermediate value between a first value and a second value in a first lookup table including the first value and the second value of which Hamming weights are identical; extracting a value corresponding to the $j^{th}$ intermediate value and a $j-1^{th}$ result value, as a $j^{th}$ result value between a third value and a fourth value in a second lookup table including the third value and the fourth value of which Hamming weights are identical; and in the case of j≠m, repeatedly performing extraction as the $j^{th}$ intermediate value and extraction as the $j^{th}$ result value by increasing J; and in the case of j=m, outputting an $m^{th}$ result value as a result value of comparison between the first ciphertext and the second ciphertext.

Advantageous Effects of Invention

According to embodiments disclosed, the disclosure produces an intermediate value and a result value associated with a ciphertext comparison operation based on a lookup table so that the produced intermediate value and result value have the same Hamming weight, thereby defending a comparison operation from a side channel attack.

BRIEF DESCRIPTION OF DRAWINGS

FIG. 2 is a diagram illustrating an example of pseudo code associated with an encapsulation (key encapsulation) algorithm and a decapsulation (key decapsulation) algorithm of a key encapsulation mechanism (KEM) to which a ciphertext comparison method according to an embodiment is applicable.

FIG. 3 is a diagram illustrating an example of pseudo code associated with an algorithm used for a ciphertext comparison operation.

FIG. 5 is a diagram illustrating an example of pseudo code associated with a ciphertext comparison method according to an embodiment.

BEST MODE FOR CARRYING OUT THE INVENTION

Hereinafter, detailed embodiments of the disclosure will be described with reference to drawings. Detailed descriptions below will be provided to help comprehensive understanding of the method, apparatus, and/or system described in the present specification. However, this is merely an example, and the present disclosure is not limited thereto.

When describing embodiments of the disclosure, if detailed descriptions associated with a well-known art related to the disclosure are determined as unnecessarily making the subject matter of the disclosure ambiguous, the detailed descriptions thereof will be omitted herein. The terms to be described below are terms defined in consideration of functions in the present disclosure, and may be changed by a user, intention of an operator, practice, or the like. Therefore, the definitions of the terms should be understood based on the contents throughout the specification. The terms used in the detailed description are merely for the purpose of describing embodiments of the disclosure and should not be intended to be restrictive. The singular forms are intended to include the plural forms as well, unless otherwise mentioned. In the descriptions, the expression "comprises", "includes", or the like specifies features, numbers, steps, operations, elements, and/or part or a combination thereof, but do not preclude the presence or possibility of one or more other features, numbers, steps, operations, elements, and/or part or combination thereof.

Figure 1:
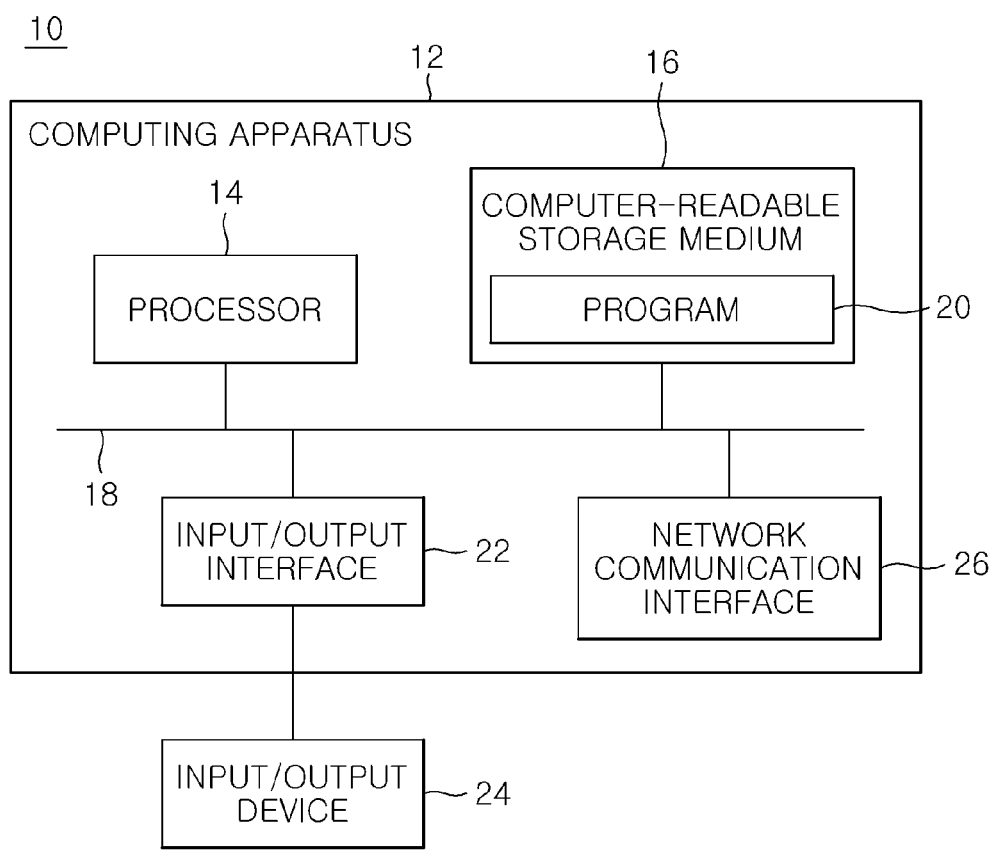
FIG. 1 is a block diagram illustrating an example of a computing environment including a computing apparatus according to an embodiment.

FIG. 1 is a block diagram illustrating an example of a computing environment including a computing apparatus according to an embodiment.

In the illustrated embodiments, the respective components may have different functions and capabilities, in addition to the description below, and an additional component that is not described below may be included.

The illustrated computing environment 10 includes a computing apparatus 12. The computing apparatus 12 may be one or more components included in an apparatus for implementing a ciphertext comparison method according to an embodiment.

The computing apparatus 12 may include at least one processor 14, a computer-readable storage medium 16, and a communication bus 18. The processor 14 may enable the computing apparatus 12 to operate according to the above-described embodiments. For example, the processor 14 may implement one or more programs stored in the computer-readable storage medium 16. The one or more programs may include one or more computer-executable instructions, and the computer-executable instructions may be configured to cause the computing apparatus 12 to perform operations according to embodiments when the computer-executable instructions are executed by the processor 14.

The computer-readable storage medium 16 may be configured to store a computer-executable instruction or program code, program data, and/or other appropriate types of information. The program 20 stored in the computer-readable storage medium 16 may include a set of instructions executable by the processor 14. According to an embodiment, the computer-readable storage medium 16 may be memory (volatile memory such as random access memory, non-volatile memory, or an appropriate combination thereof), one or more magnetic disc storage devices, optical disc storage devices, flash memory devices, and other types of storage media capable of storing information desired or accessed by the computing apparatus 12, or an appropriate combination thereof.

The communication bus 18 may include the processor 14, the computer-readable storage medium 16, and may mutually connect various other components of the computing apparatus 12.

The computing apparatus 12 may include one or more input/output interfaces 22 that provides an interface for one or more input/output devices 24, and one or more network communication interfaces 26. The input/output interface 22 and the network communication interface 26 may be connected to the communication bus 18. The input/output device 24 may be connected to other components of the computing apparatus 12 via the input/output interface 22. The illustrated input/output device 24 may include a pointing device (a mouse, a trackpad, or the like), a keyboard, a touch input device (a touch pad, a touch screen, or the like), a voice or sound input device, various types of sensor devices, and/or an input device such as a shooting device, and/or an output device such as a display device, a printer, a speaker, and/or a network card. The illustrated input/output device 24 may be included in the computing apparatus 12 as one of the components that constitute the computing apparatus 12, or may be connected to the computing apparatus 12 as a separate device from the computing apparatus 12. Here, the algorithms of FIGS. 2 and 3 described below may be performed by the computing apparatus 12 illustrated in FIG. 1.

FIG. 2 is a diagram illustrating an example of pseudo code associated with an encapsulation (key encapsulation) algorithm and decapsulation (key decapsulation) algorithm of a key encapsulation mechanism (KEM) to which a ciphertext comparison method according to an embodiment is applicable.

In the example illustrated in FIG. 2, KEM.CCA.Encaps (pk) and KEM.CCA.Decaps(sk, pk, c) respectively denote an encapsulation algorithm and a decapsulation algorithm. PKE.CPA.Enc(pk, m; r) and PKE.CPA.Dec(sk, pk, c) respectively denote an encryption algorithm and a decryption algorithm that are based on a public key which is safe from chosen plaintext attack (CPA). In addition, pk denotes a public key, sk denotes a private key, m denotes a message to be encrypted, and each of $H_1$ and $H_2$ denote a hash function.

The decapsulation algorithm as illustrated in FIG. 2 may decode, using the private key sk, ciphertext C produced via the encapsulation algorithm, and may encrypt m', which is produced via the decryption, again using the public key pk, so as to produce ciphertext C'. Subsequently, in the case that the decapsulation algorithm compares C' and C and they are identical, the decapsulation algorithm outputs a normal secret value (i.e., s'=s). In the case that they are different from each other, the decapsulation algorithm outputs a random value (i.e., s'≠s).

FIG. 3 is a diagram illustrating an example of pseudo code associated with an algorithm used for a ciphertext comparison operation.

Specifically, the algorithm illustrated in FIG. 3 is to perform a comparison operation between two ciphertext such as a comparison operation between ciphertext C' and C performed in the $4^{th}$ line of the decapsulation algorithm illustrated in FIG. 2. For example, the algorithm may be used for a lattice-based key encapsulation mechanism such as FrodoKEM, KYBER, SABER, and the like.

In the example illustrated in FIG. 3, ⊕ denotes an XOR operation, and | denotes an OR operation. In addition, >> denotes a signed right shift. Specifically, in the example illustrated in FIG. 3, (−r)>>n written in the $5^{th}$ line is an operation that converts r into a negative number and fills a left-digit bit with 1 by moving each bit of −r by n from the left to the right. Through the above, the algorithm illustrated in FIG. 3 returns r=0 in the case of C'=C, and returns r=−1 in the case of C'≠C.

A side channel analysis is a scheme of analyzing a secret value via information associated with power, electromagnetic waves, and the like that is generated when encryption or decryption is performed. In this instance, it is well known that power consumption in a light device environment in which an algorithm is embodied based on software is proportional to Hamming weight (HW) of an intermediate operation value. Therefore, the amount of power consumed when an intermediate operation value is x is as shown in Equation 1 below.

$$P = \varepsilon \cdot HW(x) + p_{noise} \qquad \text{[Equation 1]}$$

In Equation 1, $\varepsilon$ denotes a constant, and $P_{noise}$ denotes noise.

That is, HW of intermediate value x and consumed power P have linearity.

The operation written in the 3rd line of the algorithm illustrated in FIG. 3 may segment two ciphertext C and C', which are to be compared, based on a predetermined segmentation unit n, and may perform an XOR operation (i.e., $C_i \oplus C'_i$) m times, thereby being processed within a constant time. Through the above, a timing attack type of side channel attack may be prevented. In this instance, although the pre-determined segmentation unit n may be, for example, a word unit (i.e., n=32 in the case of 32-bit computing environment, n=64 in the case of 64-bit computing environment), the disclosure is not necessarily limited thereto and may be variously changeable.

In the case that C and C' are identical, r generated via the operation written in the 3rd line of the algorithm illustrated in FIG. 3 may be 0. Otherwise, r is changed to a value different from 0. In addition, in the case the two ciphertext are identical, the algorithm may output r=0, and otherwise, the algorithm may output r=−1, via an operation written in the 5th line. In this instance, −1 may be expressed as 0xffff in a 16-bit computing environment, and HW is 16. That is, in the case of −1, power is consumed in proportion to HW=16. In the case of 0, power is consumed in proportion to HW=0. As described above, in the case that the difference in HW is high, secret information may be restored by analyzing a power consumption pattern.

Figure 4:
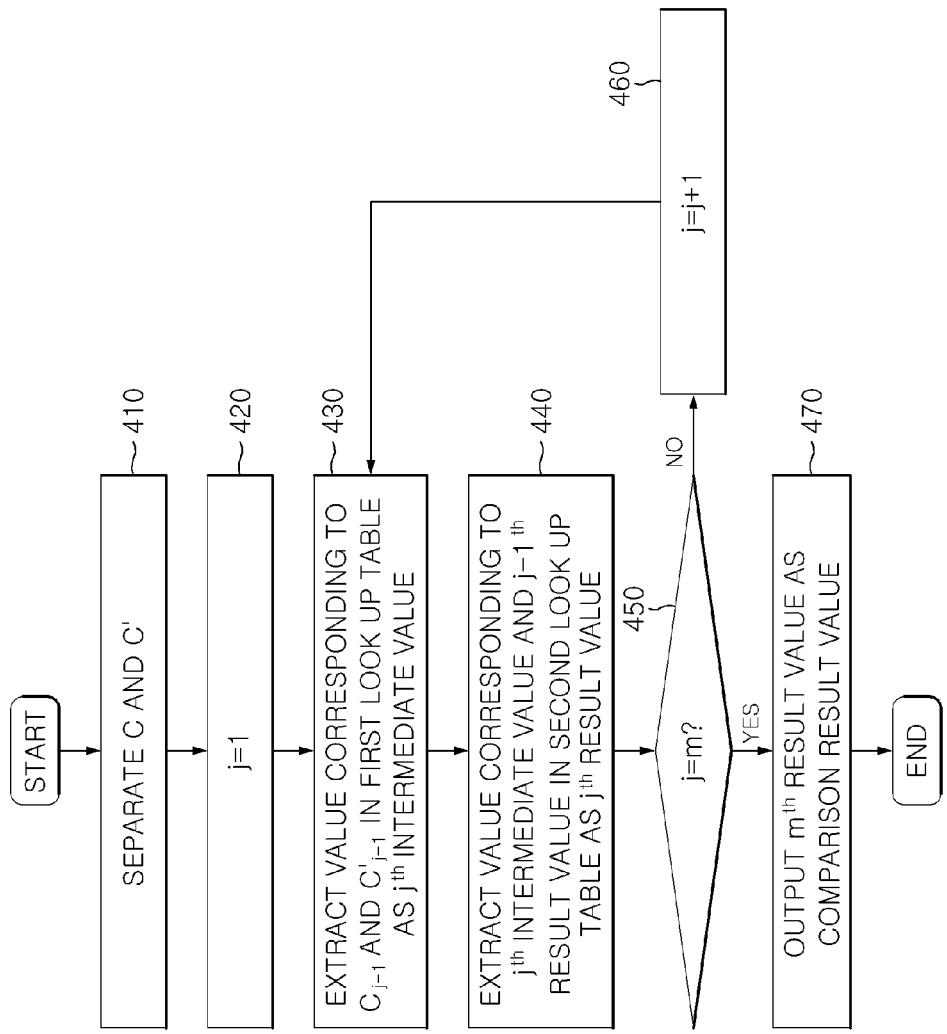
FIG. 4 is a flowchart illustrating a ciphertext comparison method according to an embodiment.

FIG. 4 is a flowchart illustrating a ciphertext comparison method according to an embodiment, and FIG. 5 is a diagram illustrating an example of pseudo code associated with a ciphertext comparison method according to an embodiment.

The method illustrated in FIGS. 4 and 5 may be performed by, for example, the computing apparatus 12 illustrated in FIG. 1.

Referring to FIGS. 4 and 5, the computing apparatus 12 may segment two ciphertext C and C', which are to be compared, into m part bitstreams, respectively, in operation 410.

In this instance, according to an embodiment, based on a predetermined segmentation unit n, the computing apparatus 12 may segment C and C' into m part bitstreams, respectively.

Specifically, the computing apparatus 12 may sequentially segment ciphertext C from a most significant bit (or a least significant bit) based on the predetermined segmentation unit n, and thus C may be segmented into m part bitstreams $C_{m-1}, C_{m-2}, \ldots, C_0$ (in this instance, $C_i \in [0,2^n)$) each of which has a length of n. In addition, the computing apparatus 12 may sequentially segment ciphertext C' from a most significant bit (or a least significant bit) based on the predetermined segmentation unit n, and thus C' may be segmented into m part bitstreams $C'_{m-1}, C'_{m-2}, \ldots, C'_0$ (in this instance, $C'_i \in [0,2^n)$) each of which has a length of n. In this instance, the computing apparatus 12 may segment C and C' based on a word unit (i.e., n=32 in the case of a 32-bit computing environment and n=64 in the case of a 64-bit computing environment), but n may be variously changeable according to an embodiment.

Subsequently, the computing apparatus 12 sets j=1, and extracts a value corresponding to $C_{j-1}$ and $C'_{j-1}$ between a first value and a second value included in a first lookup table, as a $j^{th}$ intermediate value in operation 420.

In this instance, the first value and the second value included in the first lookup table are predetermined values indicating whether $C_{j-1}$ and $C'_{j-1}$ are identical, and $i^{th}$ intermediate value may satisfy Equation 2 below.

$$tmp_j = T_1[C_{j-1} \| C'_{j-1}] = \begin{cases} A_1, & \text{if } C_{j-1} = C'_{j-1} \\ A_2, & \text{if } C_{j-1} \neq C'_{j-1} \end{cases} \quad \text{[Equation 2]}$$

In Equation 2, $tmp_j$ denotes a $j^{th}$ intermediate value, and $T_1[C_{j-1} \| C'_{j-1}]$ denotes a value of which the index has a value (i.e., $C_{j-1} \| C'_{j-1}$) that concatenates $C_{j-1}$ and $C'_{j-1}$ in the first lookup table. In addition, $A_1$ and $A_2$ denote a first value and a second value, respectively, and have the same Hamming weight (i.e., $HW(A_1)=HW(A_2)$).

Subsequently, the computing apparatus 12 extracts a value corresponding to the $j^{th}$ intermediate value and the $j-1^{th}$ result value between a third value and a fourth value included in a second lookup table, as a $j^{th}$ result value in operation 430.

In this instance, the third value and the fourth value included in the second lookup table are predetermined values indicating whether ciphertext C and C' are identical, and the $j^{th}$ result value may satisfy Equation 3 or 4 below.

$$r_j = T_1[r_{j-1} \| tmp_j] = \begin{cases} A_3 = A_1, & \text{if } r_{j-1} = tmp_j = A_1 \\ A_4 = A_2, & \text{if } r_{j-1} = A_2 \text{ or } tmp_j = A_2 \end{cases} \quad \text{[Equation 3]}$$

$$r_j = T_2[r_{j-1} \| tmp_j] = \begin{cases} A_3, & \text{if } r_{j-1} = A_3 \text{ and } tmp_j = A_1 \\ A_4, & \text{if } r_{j-1} = A_4 \text{ or } tmp_j = A_2 \end{cases} \quad \text{[Equation 4]}$$

In Equations 3 and 4, $r_j$ denotes a $j^{th}$ result value, $T_2[r_{j-1} \| tmp_j]$ denotes a value of which the index is a value obtained by concatenating $r_{j-1}$ and $tmp_j$ (i.e., $r_{j-1} \| tmp_j$) in the second lookup table. In addition, $A_3$ and $A_4$ denote the third value and the fourth value, respectively, and have the same Hamming weight (i.e., $HW(A_3)=HW(A_4)$).

In Equations 3 and 4, $r_0$ may be set to $A_3$ in advance (i.e., $r_0=A_3$).

Subsequently, the computing apparatus 12 may determine whether j=m is satisfied in operation 450.

In this instance, in the case of j≠m, the computing apparatus 12 may increase j by 1 in operation 460, and may return to operation 420.

Conversely, in the case of j=m, the computing apparatus 12 may output an $m^{th}$ result value as a result value of comparison between the ciphertext C and C' in operation 470.

At least some operations in the flowchart of FIG. 4 may be performed in a different order, may be performed with other operations in combination, may be omitted, may be performed in detailed steps, or may be performed with one or more additional steps which are not illustrated.

Although the present disclosure has been described in detail with reference to a representative embodiment, it would be apparent to those skilled in the art which the disclosure belongs to that various modifications can be made to the above-described embodiments without departing from the scope of the present disclosure. Therefore, the scope of the disclosure should not be determined merely based on the described embodiments. Rather, the scope of the disclosure should be determined based on the accompanying claims and their equivalents.

The invention claimed is:

1. A ciphertext comparison method performed by a processor in a computing apparatus, the method comprising:
    segmenting a first ciphertext and a second ciphertext into m part bitstreams (in this instance, m is a natural number satisfying 1<m), respectively;

extracting a value corresponding to a $j-1^{th}$ part bitstream (in this instance, $j=i+1$, i is a natural number satisfying $0 \leq i \leq m-1$) of the first ciphertext and a $j-1^{th}$ part bitstream of the second ciphertext, as a $j^{th}$ intermediate value between a first value and a second value in a first lookup table including the first value and the second value of which Hamming weights are identical;

extracting a value corresponding to the $j^{th}$ intermediate value and a $j-1^{th}$ result value, as a $j^{th}$ result value between a third value and a fourth value in a second lookup table including the third value and the fourth value of which Hamming weights are identical; and in a case of $j \neq m$, repeatedly performing extraction as the $j^{th}$ intermediate value and extraction as the $j^{th}$ result value by increasing J; and in a case of $j=m$, outputting an $m^{th}$ result value as a result value of comparison between the first ciphertext and the second ciphertext.

2. The method of claim 1, wherein the segmenting comprises segmenting, based on a predetermined segmentation unit, the first ciphertext and the second ciphertext into m part bitstreams, respectively.

3. The method of claim 1, wherein the extracting as the $j^{th}$ intermediate value comprises extracting a value of which an index is identical to a bitstream obtained by concatenating the $j-1^{th}$ part bitstream of the first ciphertext and the $j-1^{th}$ part bitstream of the second ciphertext, as the $j^{th}$ intermediate value between the first value and the second value in the first lookup table, and wherein the extracting as the $j^{th}$ result value comprises extracting a value of which an index is identical to a value obtained by concatenating the $j^{th}$ intermediate value and the $j-1^{th}$ result value, as the $j^{th}$ result value between the third value and the fourth value in the second lookup table.

4. The method of claim 1, wherein the first value and the second value are predetermined values indicating whether the $j-1^{th}$ part bitstream of the first ciphertext and the $j-1^{th}$ part bitstream of the second ciphertext are identical, and wherein the third value and the fourth value are predetermined values indicating whether the first ciphertext and the second ciphertext are identical.

5. The method of claim 1, wherein the $j^{th}$ intermediate value satisfies Equation 2 below, $$tmp_j = T_1[C_{j-1} \| C'_{j-1}] = \begin{cases} A_1, & \text{if } C_{j-1} = C'_{j-1} \\ A_2, & \text{if } C_{j-1} \neq C'_{j-1} \end{cases} \quad \text{[Equation 2]}$$

(in this instance, $C_{j-1}$ denotes the $j-1^{th}$ part bitstream of the first ciphertext that satisfies $C_{j-1} \in [0, 2^n)$, $C'_{j-1}$ denotes the $j-1^{th}$ part bitstream of the second ciphertext that satisfies $C'_{j-1} \in [0, 2^n)$, n denotes a predetermined segmentation unit, $A_1$ denotes the first value, $A_2$ denotes the second value, and $T_1[C_{j-1} \| C'_{j-1}]$ denotes a value of which an index is $C_{j-1} \| C'_{j-1}$ in the first lookup table).

6. The method of claim 5, wherein the $j^{th}$ result value satisfies Equation 3 or Equation 4 below, $$r_j = T_1[r_{j-1} \| tmp_j] = \begin{cases} A_3 = A_1, & \text{if } r_{j-1} = tmp_j = A_1 \\ A_4 = A_2, & \text{if } r_{j-1} = A_2 \text{ or } tmp_j = A_2 \end{cases} \quad \text{[Equation 3]}$$

$$r_j = T_2[r_{j-1} \| tmp_j] = \begin{cases} A_3, & \text{if } r_{j-1} = A_3 \text{ and } tmp_j = A_1 \\ A_4, & \text{if } r_{j-1} = A_4 \text{ or } tmp_j = A_2 \end{cases} \quad \text{[Equation 4]}$$

(in this instance, $r_j$ denotes the $j^{th}$ result value, $r_0 = A_3$, $tmp_j$ denotes the $j^{th}$ intermediate value, $A_3$ denotes the third value, $A_4$ denotes the fourth value, and $T_2[r_{j-1} \| tmp_j]$ denotes a value of which an index is $r_{j-1} \| tmp_j$ in the second lookup table).

7. A ciphertext comparison apparatus, the apparatus comprising:

a memory storing one or more instructions; and one or more processors executing the one or more instructions, wherein the one or more processors are configured to:

segment a first ciphertext and a second ciphertext into m part bitstreams (in this instance, m is a natural number satisfying $1 < m$), respectively;

extract a value corresponding to a $j-1^{th}$ part bitstream (in this instance, $j=i+1$, i is a natural number satisfying $0 \leq i \leq m-1$) of the first ciphertext and a $j-1^{th}$ part bitstream of the second ciphertext, as a $j^{th}$ intermediate value between a first value and a second value in a first lookup table including the first value and the second value of which Hamming weights are identical;

extract a value corresponding to the $j^{th}$ intermediate value and a $j-1^{th}$ result value, as a $j^{th}$ result value between a third value and a fourth value in a second lookup table including the third value and the fourth value of which Hamming weights are identical;

in a case of $j \neq m$, repeatedly perform extraction as the $j^{th}$ intermediate value and extraction as the $j^{th}$ result value by increasing J; and in a case of $j=m$, output an $m^{th}$ result value as a result value of comparison between the first ciphertext and the second ciphertext.

8. The apparatus of claim 7, wherein the one or more processors are configured to segment, based on a predetermined segmentation unit, the first ciphertext and the second ciphertext into m part bitstreams, respectively.

9. The apparatus of claim 7, wherein the one or more processors are configured to:

extract a value of which an index is identical to a bitstream obtained by concatenating the $j-1^{th}$ part bitstream of the first ciphertext and the $j-1^{th}$ part bitstream of the second ciphertext, as the $j^{th}$ intermediate value between the first value and the second value in the first lookup table, and extract a value of which an index is identical to a value obtained by concatenating the $j^{th}$ intermediate value and the $j-1^{th}$ result value, as the $j^{th}$ result value between the third value and the fourth value in the second lookup table.

10. The apparatus of claim 7, wherein the first value and the second value are predetermined values indicating whether the $j-1^{th}$ part bitstream of the first ciphertext and the $j-1^{th}$ part bitstream of the second ciphertext are identical, and wherein the third value and the fourth value are predetermined values indicating whether the first ciphertext and the second ciphertext are identical.

11. The apparatus of claim 7, wherein the $j^{th}$ intermediate value satisfies Equation 2 below, $$tmp_j = T_1[C_{j-1} \| C'_{j-1}] = \begin{cases} A_1, & \text{if } C_{j-1} = C'_{j-1} \\ A_2, & \text{if } C_{j-1} \neq C'_{j-1} \end{cases} \quad \text{[Equation 2]}$$

(in this instance, $C_{j-1}$ denotes the j–1$^{th}$ part bitstream of the first ciphertext that satisfies $C_{j-1} \in [0,2^n)$, $C'_{j-1}$ denotes the j–1$^{th}$ part bitstream of the second ciphertext that satisfies $C'_{j-1} \in [0,2^n)$, n denotes a predetermined segmentation unit, $A_1$ denotes the first value, $A_2$ denotes the second value, and $T_1[C_{j-1}||C'_{j-1}]$ denotes a value of which an index is $C_{j-1}||C'_{j-1}$ in the first lookup table).

12. The apparatus of claim 11, wherein the j$^{th}$ result value satisfies Equation 3 or Equation 4 below, $$r_j = T_1[r_{j-1} \| tmp_j] = \begin{cases} A_3 = A_1, & \text{if } r_{j-1} = tmp_j = A_1 \\ A_4 = A_2, & \text{if } r_{j-1} = A_2 \text{ or } tmp_j = A_2 \end{cases} \quad [\text{Equation 3}]$$

$$r_j = T_2[r_{j-1} \| tmp_j] = \begin{cases} A_3, & \text{if } r_{j-1} = A_3 \text{ and } tmp_j = A_1 \\ A_4, & \text{if } r_{j-1} = A_4 \text{ or } tmp_j = A_2 \end{cases} \quad [\text{Equation 4}]$$

(in this instance, $r_j$ denotes the j$^{th}$ result value, $r_0 = A_3$, $tmp_j$ denotes the j$^{th}$ intermediate value, $A_3$ denotes the third value, $A_4$ denotes the fourth value, and $T_2[r_{j-1}||tmp_j]$ denotes a value of which an index is $r_{j-1}||tmp_j$ in the second lookup table).

13. A non-transitory computer-readable storage medium storing instructions which, when executed by a processor, cause a computing apparatus comprising the processor to perform operations for text-based document classification, the operations comprising:

segmenting a first ciphertext and a second ciphertext into m part bitstreams (in this instance, m is a natural number satisfying 1<m), respectively;

extracting a value corresponding to a j–1$^{th}$ part bitstream (in this instance, j=i+1, i is a natural number satisfying 0≤i≤m–1) of the first ciphertext and a j–1$^{th}$ part bitstream of the second ciphertext, as a j$^{th}$ intermediate value between a first value and a second value in a first lookup table including the first value and the second value of which Hamming weights are identical;

extracting a value corresponding to the j$^{th}$ intermediate value and a j–1$^{th}$ result value, as a j$^{th}$ result value between a third value and a fourth value in a second lookup table including the third value and the fourth value of which Hamming weights are identical; and in a case of j≠m, repeatedly performing extraction as the j$^{th}$ intermediate value and extraction as the j$^{th}$ result value by increasing J; and in a case of j=m, outputting an m$^{th}$ result value as a result value of comparison between the first ciphertext and the second ciphertext.

\* \* \* \* \*